United States Patent [19]

Pusch et al.

[11] Patent Number: 4,463,653
[45] Date of Patent: Aug. 7, 1984

[54] METHOD AND APPARATUS FOR PROTECTING VEHICLES AGAINST RECONNAISSANCE BY IR-IMAGING EQUIPMENT

[76] Inventors: Günter Pusch, Bannholzweg 12, 6903 Neckargemünd 2, Fed. Rep. of Germany; Alexander Hoffmann, Heidelberger Str. 24, 6901 Mauer, Fed. Rep. of Germany

[21] Appl. No.: 226,786

[22] Filed: Jan. 21, 1981

Related U.S. Application Data

[63] Continuation of Ser. No. 942,704, Aug. 23, 1978, abandoned.

[30] Foreign Application Priority Data

Nov. 25, 1977 [DE] Fed. Rep. of Germany ....... 2752729

[51] Int. Cl.$^3$ .............................................. F41H 3/00
[52] U.S. Cl. ..................................... 89/14.1; 60/39.5; 89/36 R; 89/36 H; 180/68.1
[58] Field of Search ................... 60/39.5, 264; 89/14.1, 89/36 R, 36 A; 180/54 A; 181/220, 225

[56] References Cited

U.S. PATENT DOCUMENTS

| | | | |
|---|---|---|---|
| 2,988,302 | 6/1961 | Smith | 181/220 |
| 3,210,934 | 10/1965 | Smale | 60/264 |
| 3,817,030 | 6/1974 | Renius et al. | 60/39.5 |
| 4,002,024 | 1/1977 | Nye et al. | 60/264 |

FOREIGN PATENT DOCUMENTS

| | | |
|---|---|---|
| 1576781 | 3/1970 | Fed. Rep. of Germany . |
| 1530842 | 1/1971 | Fed. Rep. of Germany . |
| 2731205 | 1/1980 | Fed. Rep. of Germany . |
| 504091 | 6/1920 | France ................ 89/14.1 |
| 2338380 | 8/1977 | France . |
| 870112 | 6/1961 | United Kingdom ............... 181/225 |

*Primary Examiner*—Stephen C. Bentley
*Attorney, Agent, or Firm*—Michael N. Meller

[57] ABSTRACT

An arrangement for the protection of vehicles against IR-IMAGING equipment by cooling air, in which the hot or warm exhaust gases are surrounded by a laminar flow of cooling air. The outside air which is drawn in by the cooling mechanism or the motor ventilation system, is first moved over the thermally radiating areas of the vehicle, and then to the cooling unit or the motor itself for combustion. Part of the outside air which is drawn in, serves as the laminar cover stream of the transferred heated-up cooling air and/or the exhaust gases. These exhaust gases, the heated up cooling air and the surrounding outside air represents a coaxial system of gas flows. In the center of this system, flow the exhaust gases, and the heated-up cooling air flows in the central annular portion. The outside air is directed through the outside annular flow portion of the coaxial system. Two separate ventilation systems are used for drawing in the air for cooling and combustion, as well as for drawing in the air of the cover system. The surrounding outside air may be accelerated additionally by an annular fan and then narrowed by means of a nozzle in its cross section. The coaxial system of gas flows is directed through a bent turnable and removable outlet tube, so that viewing into the inner hot parts of the exhaust pipe system may be avoided. The drawn-in outside air may be led through the intermediate space of a binding cover system above or below the outer surface or shell of the actual vehicle.

8 Claims, 6 Drawing Figures

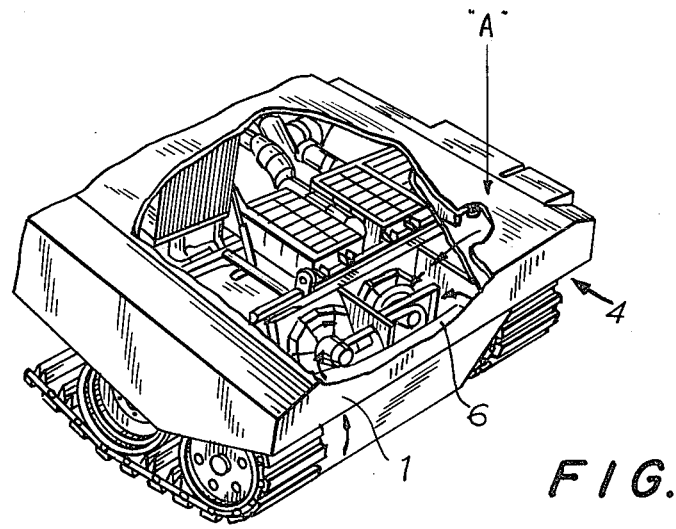
FIG. 2
FIG. 3
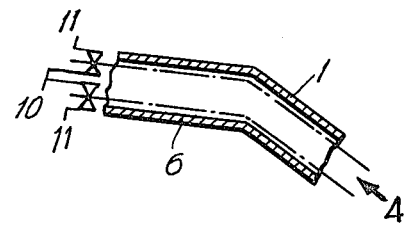

METHOD AND APPARATUS FOR PROTECTING VEHICLES AGAINST RECONNAISSANCE BY IR-IMAGING EQUIPMENT

This application is a continuation of application Ser. No. 942,704, filed Aug. 23, 1978 now abandoned.

BACKGROUND OF THE INVENTION

The present invention is related to the procedure and apparatus for protecting vehicles against reconnaissance by IR-imaging equipment, preferably in the spectral region of self-radiation of the vehicles by the addition of cooling air. The hot or warm exhaust gases are surrounded by a laminar flow of cold air as the inventors have previously proposed in German Patent application P27 31 205.6, U.S. Ser. No. 916,959 on June 19, 1978, now abandoned.

The object of the present invention is to appreciably reduce the very strong thermal signatures of battle tanks and trucks, to avoid the reconnaissance and detection at larger distances. For example, the battle tanks of today can be recognized at distances larger than 5 km, particularly when they are moving and can be identified by their characteristic movements of the hot spots.

The thermal signatures or identifying characteristics are caused on the one hand by the outside parts of the tank body heated-up by the motor or the tank's cooling system and on the other hand by the discharge locations of the hot exhaust gases, which are blown off at different places depending on the type of vehicle. The present designs of military vehicles did not take into account these signatures since the tank or vehicle designers had no information on the threat of detection from IR reconnaissance systems and IR trackers.

The object of the present invention is, therefore, to provide procedures and apparatus assemblies which largely avoid the detection of the exhaust openings as well as the heating-up of the outer shell of the vehicle by means of IR reconnaissance systems.

Another object of the present invention is to provide an arrangement, of the foregoing character, which is substantially simple in construction and may be economically fabricated.

A further object of the present invention is to provide an arrangement, as described, which does not require specially-skilled operating personnel to apply.

SUMMARY OF THE INVENTION

The objects of the present invention are achieved by providing an arrangement in which the hot exhaust gases are surrounded by cooling air in a laminar flow. The outside air is drawn or sucked in by the cooling mechanism or the ventilation system of the motor or engine. The air is then carried over the thermally radiating areas of the vehicle, and from there to the cooling unit or to the motor or engine itself for combustion. A part of the drawn-in air from the outside, serves as the laminar cover stream for the transferred heated-up cooling air or exhaust gases.

In accordance with the present invention, the exhaust gases, the heated-up cooling air, and the surrounding outside air represent a coaxial system of gas flows, in which the exhaust gases flow through the center. The central annular area serves as a duct for conducting the heated-up cooling air, and the outside annular flow area serves to conduct the outside air.

Two separate ventilation systems are used in the arrangement of the present invention. One system is used for drawing in the air for cooling and combustion, and another system is used for drawing in the air of the cover system.

The surrounding outside air may, furthermore, be accelerated by an annular fan, and then narrowed down by the use of a nozzle in its cross section.

The coaxial system of gas flows may be directed through a bent turnable and removable outlet tube. With this arrangement, the inner hot parts of the exhaust pipe system cannot be viewed. The drawn-in outside air, furthermore, is led through the intermediate space of a blinding cover system above or below the outer shell of the vehicle. The inner walls of the channels of the cover system, sucking in the outside air, have a heat insulating layer which is coated perferably with metalic reflection layers.

The outer and inner shell of the sucking-in system may be in the form of a bulkhead armor, in proving thereby the ballistic protection.

The outside air may be sucked in between the tracks and the suspensions, as well as the fenders, and then passed into the shell system by slots and conducted from there to the motor or cooling and/or combustion system.

The nozzle features which are considered as characteristic for the invention as set forth in particular in the appended place. The invention itself, however, both as its construction and its method of operation, together with additional objects and advantages thereof, will be best understood from the following description of specific enbodiments when read in connection with the accompanying drawings.

BRIEF DESCRIPTION OF THE DRAWINGS

FIG. 2 shows inner and outer shell of tank in a cut-open view;

FIG. 3 shows flow of outside air between inner and outer shell;

DESCRIPTION OF THE PREFERRED EMBODIMENTS

Figure 1:
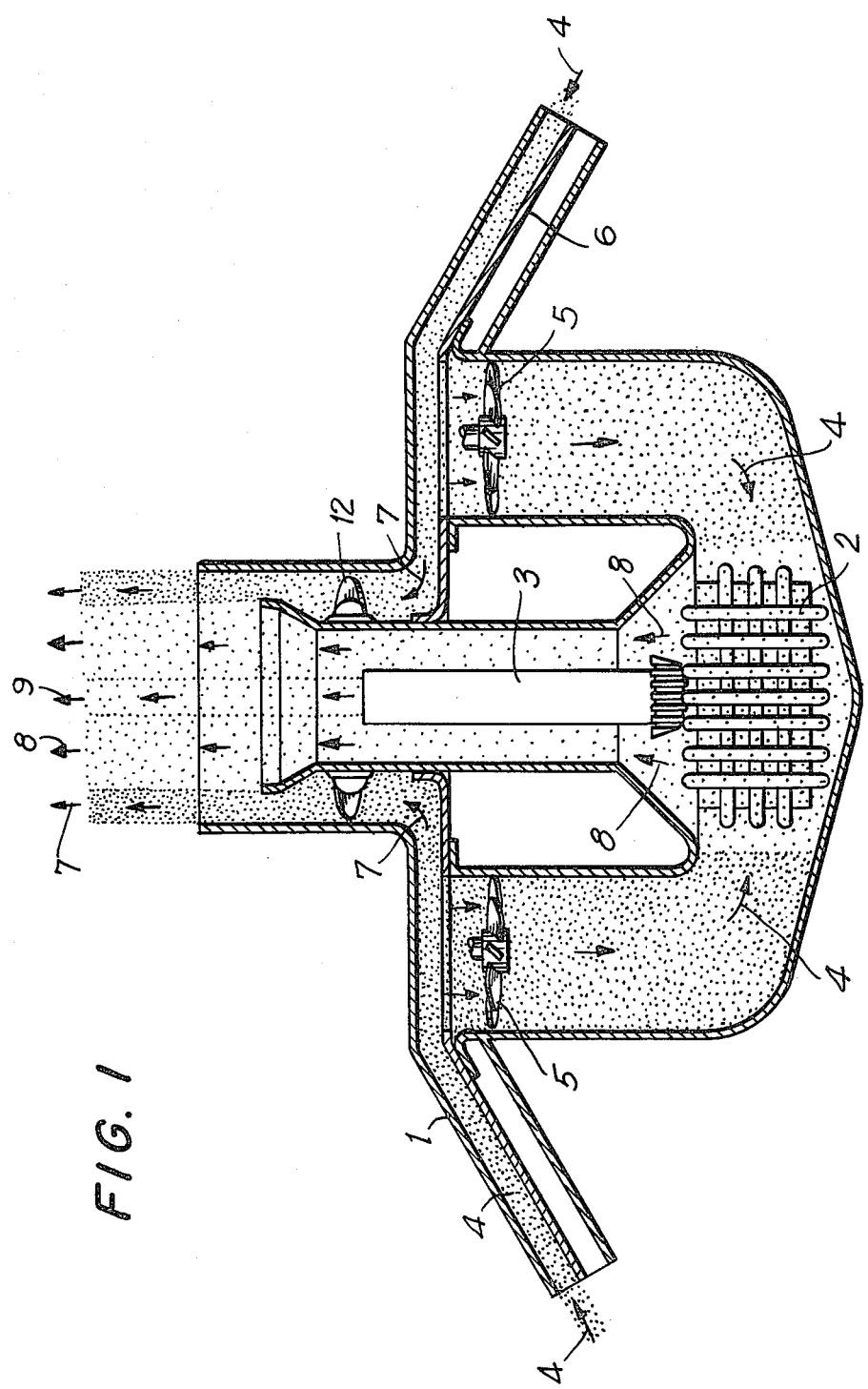
FIG. 1 is a schematic view and shows coaxial system of gas flows in accordance with the present invention.

FIG. 1 represents one embodiment of the invention. The outside air 4 is led via blower 5 to the motor block or cooler 2 and thus covers the heated-up parts 6 of the vehicle. Part 7 of the sucked-in air serves for surrounding laminarly the transferred heated-up cooling air 8 and/or the exhaust gases 9 which are discharged by the exhaust 3.

According to another embodiment of the present invention, the exhaust gases 9, the heated-up cooling air 8 after use and the surrounding outside air 7 are arranged as a coaxial system of gas flows; in the center of this coaxial system the exhaust gases 9 flow; in the central annular gas flow of this coaxial system the heated-up cooling air 8 flows; the outside annular flow of this coaxial system conducts the outside air 7, thus cooling the surrounding outer tube.

In addition, it is proposed that the air 4 intended for cooling and combustion and the surrounding air 7 be driven by two separate ventilation systems 5 and 12.

In order to prevent perturbation of the surrounding air 7 by the warm flows 8 and 9, it is necessary that all three flows have approximately the same velocity. This is effected by accelerating the surrounding outside air 7 by an annular fan 12 and narrowing its cross section by using an annular nozzle.

Figure 6:
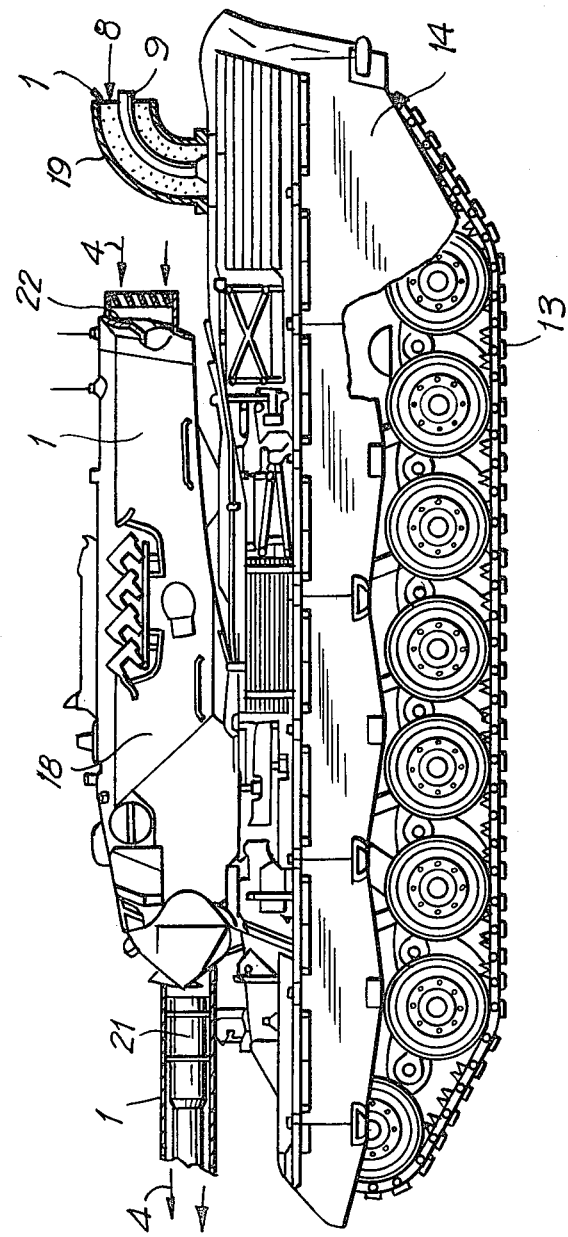
FIG. 6 shows side view of a tank with installed apparatus in accordance with the present invention.

In order to prevent detection of vehicles by means of line-scan IR systems, it is proposed, according to FIG. 6, to place a bent tube 19, which is turnable and removable, on the gas outlet, to deviate the laminar coaxial gas flow system. Because of the surrounding outside air 7, the bent tube does not warm up so that it cannot be detected by IR imaging. In order to shoot backwards in case of retreat, the tube 19 can be thrown off, when the turret 18 is turned by means of the gun barrel. As IR-line-scan equipment discoveres warm or hot objects from above (±60° to the verticle) the outlet of warmed-up cooling air or of hot exhaust gases could be recognized without tube 19 on top of the engine part of the tank on FIG. 6. On the other hand several models of battle tanks don't allow additional voluminous parts in this area, because the gun barrel could not be moved freely in all directions. In a case like this, where the exhaust gases and the cooling gases cannot be blown off at the rear, (for some model there is no problem and the bend tube 19 would then be placed at the rear), but also the tube 19 would restrain the free movement of the gun barrel the bend tube 19 is attached in a certain loose way, so that the gun barrel can knock or kick off said tube 19 to operate in every direction in a certain situation. It would then be necessary to replace the thrown-off tube by a new one after the battle or to build it out of flexible material which stands up itself afterwards. According to FIG. 3, the sucked-in outside air 4 is admitted by a cover system which is above or below the outer shell 1 and/or inner shell 6 of the present vehicle. When retrofitting vehicles already in service, the outer shell 1 is preferred. As for the design of new vehicles, the inner shell 6 and the outer shell 1 will represent a combined system.

According to the present invention, the inner wall of both inner and outer shells, i.e. the inner walls of the air intake channels will have a heat insulation layer 11 which are preferably coated with metallic reflection layers 10. Since in armored vehicles of the latest design in most cases a bulkhead armor is provided for ballistic protection, it is proposed that the space between the outer armor shell 1 and the underneath armor 4 is used as an intake channel for the outside air. (Detail "A" in FIG. 2)

Figure 4:
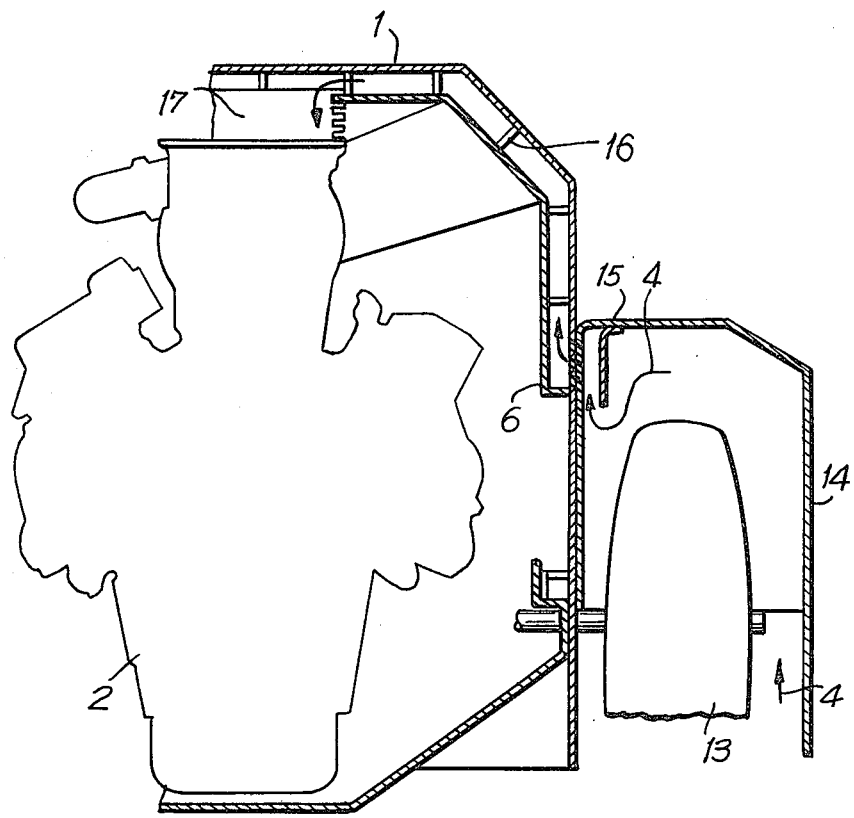
FIG. 4 shows wheel cases with outside air intakes.

Since the tracks and suspensions of tanks as well as the tires 13 of vehicles are heated up to a relatively high extent during drive (differences in temperature of more than 10° C. against background have been recorded) another embodiment of the invention is to provide the wheel cases according to FIGS. 4 and 6 as outer cover 14, through which the outside air 4 is sucked in. These covers obscure to a large extent the tracks or tires and can be constructed in a known manner by means of rubber-like fender skirts.

The outside air 4 is then led around the tracks and suspensions and conducted into the actual cover system 1 and 6, passing a dirt-trapping plate 15 via suitable slots, and carried on to the cooling unit 17 as well as to the motor 2.

Another embodiment of the present invention provides that the spacers 16 which are between the shells 1 and 6 are conducting plates in such a manner that the air flow on warmed-up spots of the vehicle is increased and correspondingly decreased on cooler spots.

Figure 5:
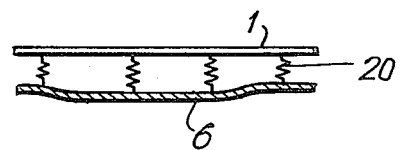
FIG. 5 shows air flow space between inner and outer shell.

In order to avoid damming up of the air flow in the shell system 1 and 6, the inner shell 6 is designed elastically as is shown in FIG. 5 and is supported by elastic spacers, e.g. springs 20, in such a manner, that the cross section of the system can change when cold air 4 is flowing through. By such control, the constant air flow of the whole shell system is maintained to prevent a non-uniform heating-up of the tanks or car body as well as the occurrence of hot spots.

Since the gun barrel heats up considerably after firing and is identified as a straight long illuminated line over very large distances by means of thermal imaging, it is proposed, as is shown in FIG. 6, that the gun barrel 21 be surrounded by a heat-protecting cover or shell 1, and in the intermediate space outside air is blown through by a separate ventilation system 22.

According to another embodiment of the present invention, the fan 22 is mounted on the turret and the outside air is led through the cover or shell system 1 around the turret 18 so that the turret is prevented from emitting thermal radiation to a high degree.

Without further analysis, the foregoing will so fully reveal the gist of the present invention that others can, by applying current knowledge, readily adopted for various applications without omitting features that, from the standpoint of prior art, fairly constitute essential characteristics of the generic or specific aspects of this invention and, therefore, such adaptation should and are intended to be comprehended within the meaning and range of equivalence of the following claims.

We claim:

1. An arrangement for protection of land based vehicles against IR-imaging equipment comprising: means for surrounding hot or warm exhaust gases by contact with a laminar flow of cooling air flowing at the same rate as said exhaust gases; means for carrying outside air sucked in by a cooling ventilation system over thermally radiating areas of a vehicle; means for conducting said outside air to a cooling unit and to a motor for combustion; means for using part of the sucked-in outside air as said laminar flow to cover said exhaust gases; an annular fan for accelerating the surrounding outside air; and a binding cover system spaced from an outer shell of said vehicle, having channels with inner walls and a heat insulation layer coated with metallic reflection layers on said inner walls, the sucked in outside air being conducted through an intermediate space means of said blinding cover system.

2. An arrangement as defined in claim 1 wherein the exhaust gases, the heated-up cooling air and the surrounding outside air form a coaxial system of gas flows having a center portion, a central annular portion and an outside annular portion; the exhaust gases flowing through said center portion, the heated-up cooling air flowing through said central annular portion, and the outside air flowing through said outside annular portion; a bent turnable and removable outlet tube for conducting said coaxial system of gas flows to inhibit viewing into the inner hot part of an exhaust pipe system.

3. An arrangement as defined in claim 1 wherein said sucking-in means are built as an outer and inner shell comprising armor means.

4. An arrangement as defined in claim 1 wherein said vehicle has tracks, suspensions, and fenders, said outside air being sucked-in between said tracks and suspensions as well as said fenders, said outside air being thereafter conducted to said cover stream by slots and supplied to the motor for cooling thereof.

5. An arrangement as defined in claim 1 including spacers in said cover stream and formed as conducting plates to increase the air flow on spots of the vehicle with elevated temperatures.

6. An arrangement as defined in claim 1 wherein said cover system has an elastic inner part supported by elastic spacers for varying the cross section when outside air flows through, whereby a constant air flow of the whole area of said cover system is maintained.

7. An arrangement as defined in claim 1 wherein said vehicle is a tank with gun barrel and includes a separate ventilation system, said gun barrel being protected against thermal radiation by a surrounding heat-protecting shell, outside air being blown between said barrel and said shell by said separate ventilation system.

8. An arrangement as defined in claim 7 including a shell system covering the heated-up parts of the turret of said tank, outside air for cooling the gun barrel being sucked in by said shell system.

* * * * *